(12) United States Patent
Beyabani et al.

(10) Patent No.: US 8,407,738 B2
(45) Date of Patent: Mar. 26, 2013

(54) TELEVISION TUNING ON START-UP

(75) Inventors: Syed Zafar Beyabani, Irving, TX (US); Syed Beyabani, Houston, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 413 days.

(21) Appl. No.: 12/270,048

(22) Filed: Nov. 13, 2008

(65) Prior Publication Data

US 2010/0122296 A1    May 13, 2010

(51) Int. Cl.
*G06F 3/00* (2006.01)
*G06F 13/00* (2006.01)
*H04N 5/445* (2011.01)
*H04N 7/173* (2011.01)
*H04N 5/50* (2006.01)

(52) U.S. Cl. ............. 725/39; 725/61; 725/131; 348/731

(58) Field of Classification Search ...................... 725/46
See application file for complete search history.

(56) References Cited

U.S. PATENT DOCUMENTS

| 7,849,226 B2* | 12/2010 | Zigmond et al. ................. 710/1 |
| 2002/0078453 A1* | 6/2002 | Kuo ................................ 725/46 |
| 2009/0158337 A1* | 6/2009 | Stiers et al. ..................... 725/44 |
| 2010/0235852 A1* | 9/2010 | Mears ............................. 725/9 |

OTHER PUBLICATIONS

Kumar. "Progressbar for Slow Loading Webpages" Sep. 18, 2004. Retrieved Jun. 5, 2012. http://www.codeproject.com/Articles/8319/Progressbar-for-Slow-Loading-Webpages.*

* cited by examiner

*Primary Examiner* — Bennett Ingvoldstad

(57) ABSTRACT

A method includes requesting most-watched program information from a subscription television service and identifying the most-watched program for a current time slot. The method further includes receiving a channel identification for the most-watched program for the current time slot, automatically tuning to the most-watched program based on the channel identification, and displaying the most-watched program. The most-watched program may be tuned at the start of a set-top box initialization sequence to give perception of a fast start time.

20 Claims, 7 Drawing Sheets

TELEVISION TUNING ON START-UP

BACKGROUND INFORMATION

The proliferation of channels for subscription television (such as cable, optical fiber, or satellite subscriptions) can provide viewers with numerous viewing options. Searching though available channels can be time-consuming. Electronic program guides and/or other applications may provide a viewer with an effective way to sort though a wide variety of available channel options. These electronic program guides and/or other applications may be updated by providing current information through the subscription television network. However, there may be a noticeable time lag between when a user turns on a television and when the features of the electronic program guide become available, as the initialization process for some electronic program guides and other applications may take several minutes.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit a set-top box (STB) for a subscription television service to identify a program most-likely suited to a particular viewer's preference and to tune into that program almost immediately after the viewer turns on a television. The program most-likely suited to the particular viewer's preference at a particular time may be determined by identifying the user's criteria and historical viewing information of the particular viewer and/or other subscribers. The user's criteria may be entered during a previous viewing session, and may be submitted over a network to a server for the subscription service during an initial handshake sequence between the STB and the server. The server may identify an appropriate channel based on the viewer's criteria, and may provide the channel information to the STB. Thus, a viewer can immediately view program content likely to meet the viewer's preference during the STB's initialization sequence of other channel-selection options, such an electronic program guide.

The program generally corresponding to a user's criteria may be referred to herein as a "top program." As used herein, the terms "set-top box" or "STB" may refer to any media processing system that may receive multimedia content over a network, and may provide such multimedia content to an attached television. Also, as used herein, the terms "viewer," "user," and "customer" may refer interchangeably to a person who views, listens, or plays a multimedia program, video, and/or music (e.g., provided via a STB).

Figure 1:
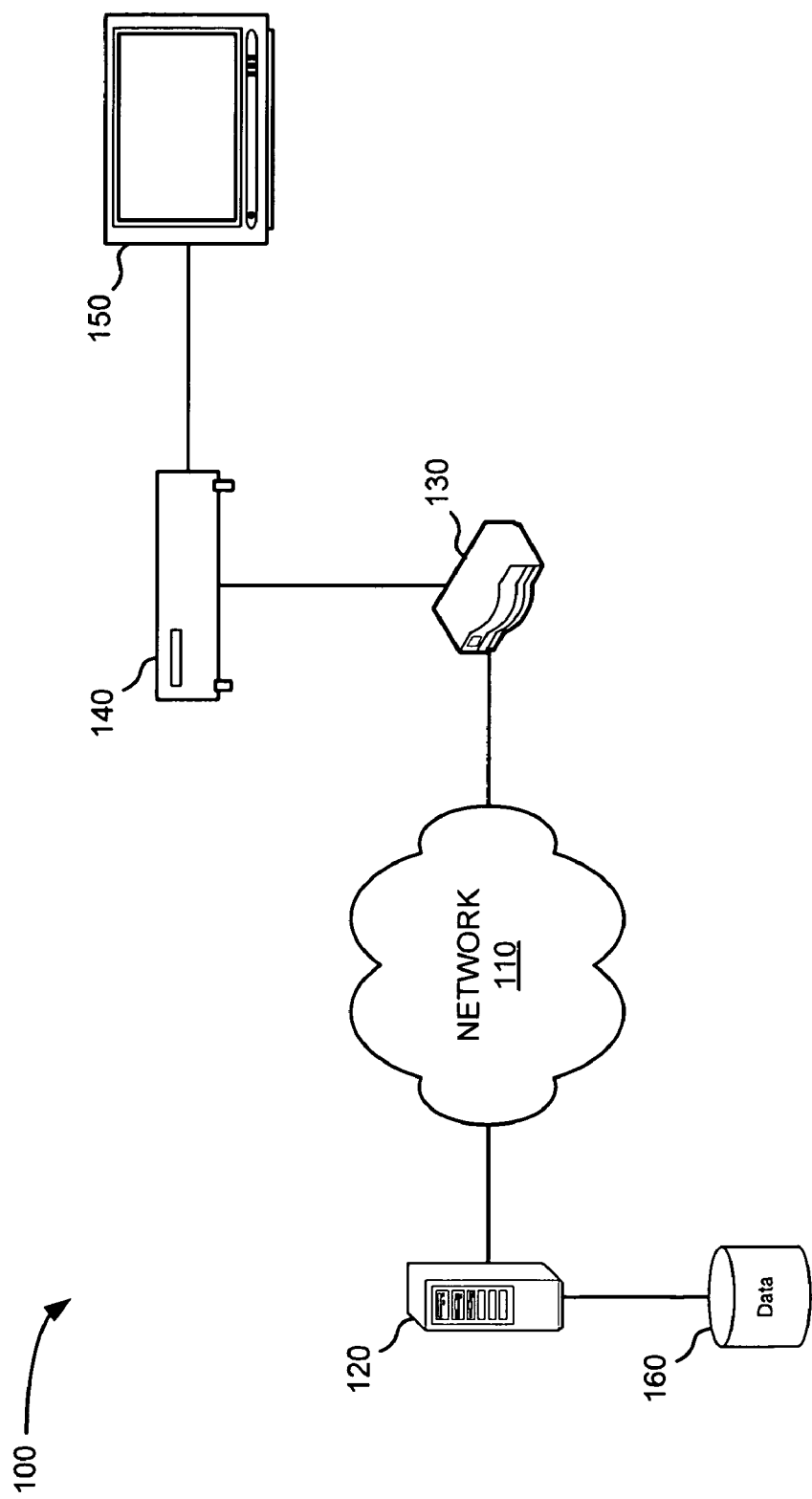
FIG. 1 depicts an exemplary system in which concepts described herein may be implemented.

FIG. 1 is a diagram of an exemplary system 100 in which concepts described herein may be implemented. As illustrated, system 100 may include a network 110 that connects a server 120 to a local gateway 130, a STB 140 and a television 150 that may be located on a customer's premises. Components of system 100 may interconnect via wired and/or wireless connections. A single network 110, server 120, local gateway 130, STB 140, and television 150 have been illustrated in FIG. 1 for simplicity. In practice, there may be more networks 110, servers 120, local gateways 130, STBs 140, and/or televisions 150. Also, in some instances, one or more of the components of network 100 may perform one or more functions described as being performed by another one or more of the components of network 100.

In general, server 120 may provide or provide control over (e.g., via network 110) telecommunication services provided to devices, such as television 150 and/or other network connectivity devices (e.g., Internet and telephone, not shown) provided on the customer's premises. As further shown in FIG. 1, server 120 may connect to a database 160.

Network 110 may include a local area network (LAN), a wide area network (WAN), such as a cellular network, a satellite network, or the Internet, a private WAN, or a combination of the Internet and a private WAN, etc. that is used to transport data. Although shown as a single element in FIG. 1, network 110 may include a number of separate networks that function to provide services to devices, such as television 150, at a customer's premises. In one implementation, network 110 may terminate at the customer's premises via an optical communication link, such as an optical fiber provided to the customer's premises. In another possible implementation, network 110 may terminate at the customer's premises via a coaxial cable. In still another implementation, network 110 may terminate at the customer's premises via a wireless (e.g., satellite) connection.

Server 120 may include one or more devices for providing content/information to STB 140 and/or television 150 in accordance with commands that are issued from STB 140. Examples of server 120 may include a headend device that provides broadcast television programs, a video-on-demand device that provides television programs upon request, and a program guide information server that provides information related to television programs available to STB 140. Server 120 may also receive information from one or more STBs, such as recorded information from STB 140 that may include viewing histories tracked by STB 140. Server 120 may store the information from the STBs in, for example, a database, such as database 160.

Gateway 130 may include a network device that provides an interface from network 110 to television 150 and other network connectivity devices (not shown). For example, when telecommunication services are provided to the customer's premises via an optical fiber, gateway 130 may include an optical network terminal (ONT) that connects to the optical fiber. The ONT may convert between signals appropriate for television 150 and signals appropriate for transmission over optical fiber. For example, the ONT may include a coaxial cable connection that leads to television 150 or STB 140. The ONT may also include an Ethernet output port that connects to a personal computer or a VoIP telephone and/or a standard telephone port for connecting to a standard telephone.

Gateway 130 may include one of a number of possible gateway devices, including a satellite antenna, a coaxial cable connection, an ONT, or a broadband access for Internet protocol TV (IPTV). The satellite antenna and receiver may provide an interface for television service broadcast from satellites. The coaxial cable connection may provide an interface for television service connected to a consumer via coaxial cables. The ONT may provide an interface for an optical fiber connection. The broadband IPTV access may generally include any device that provides broadband access over which television service may be provided.

STB 140 may include a device for selecting and/or obtaining content that may be shown or played on television 150. STB 140 may receive a television signal from gateway 130, may convert the signal to a form usable by television 150, and may transmit the signal to television 150 for display. STB 140 may further allow a user to alter the programming provided to television 150 based on a signal (e.g., a channel up or channel down signal) from, for example, a remote control (not shown). STB 140 may also be capable of sending data to server 120.

In one implementation, STB 140 may track information relating to programs provided to television 150. In another implementation, STB 140 may track information relating to programs output to other devices (not shown), such as a video cassette recorder (VCR), a digital video recorder (DVR), external storage device, or a remote streaming video viewing device. STB 140 may provide some or all of the tracked program viewing information to a server, such as server 120. STB 140 may also obtain tracked program viewing information and provide the obtained program viewing information to television 150. STB 140 may obtain tracked program viewing information from an internal memory and/or from server 120.

Television 150 may include a digital or analog television through which a user may watch television programming. Television 150 may refer to any device that can receive and display multimedia content delivered over network 110 for perception by users. Television 150 may include technologies such as cathode ray tube (CRT) displays, liquid crystal displays (LCDs), light-emitting diode (LED) displays, plasma displays and any attendant audio generation facilities.

Database 160 may maintain entries relating to subscribers' viewing histories. For example, database 160 may store information that server 120 receives from one or more STBs. In one implementation, database 160 may include exemplary fields, such as, a user-identification field, a date field, a time field, a channel field, and/or a program identification field. While only one database is shown in FIG. 1, database 160 may consist of multiple databases stored locally at server 120 and/or stored at one or more different and possibly remote locations. Database 160 may maintain additional or different information relating to information regarding programs watched by viewers. In another implementation, for example, the date field, the time field, the channel field, and/or the program identification field may be replaced with a single field that stores an identifier that represents the date, time, channel, and identification of a program to which a STB (such as STB 140) was tuned.

In implementations described herein, a user may power up STB 140 and television 150 to begin viewing. STB 140 may send a message (via network 110) to server 120 to begin an initialization sequence (such as a start-up sequence for electronic program guide or other application) that requires transmission of information from server 120 to STB 140. In one implementation, the message may include a request for the top program from all available programs. In another implementation, the top program request may indicate criteria for a most-watched program within a particular category (e.g., sports, news, comedy, etc.). Based on information provided in database 160, server 120 can identify the top program, and can quickly send the corresponding channel information over network 110 to STB 140. STB 140 may receive the channel information, and may automatically tune to the top program for display on television 150. The initialization sequence may continue while the top program is displayed.

In one exemplary implementation, television 150 and STB 140 may be connected through one or more audio/video (AV) devices (not shown), such as an audio/video receiver, a video amplifier, video switches, a videocassette recorder (VCR), and/or a digital video disc (DVD) players. In general, AV devices may represent any audio or video equipment that a customer installs to provide additional audio/video capabilities or to enhance the capabilities of existing equipment. Additionally, although only a single television 150 is shown in FIG. 1, any particular customer's premises may include a number of devices capable of displaying multimedia content. Further, although a television for a single customer's premises is shown in FIG. 1, server 120 may interact with many customers' premises and/or their televisions.

Figure 2:
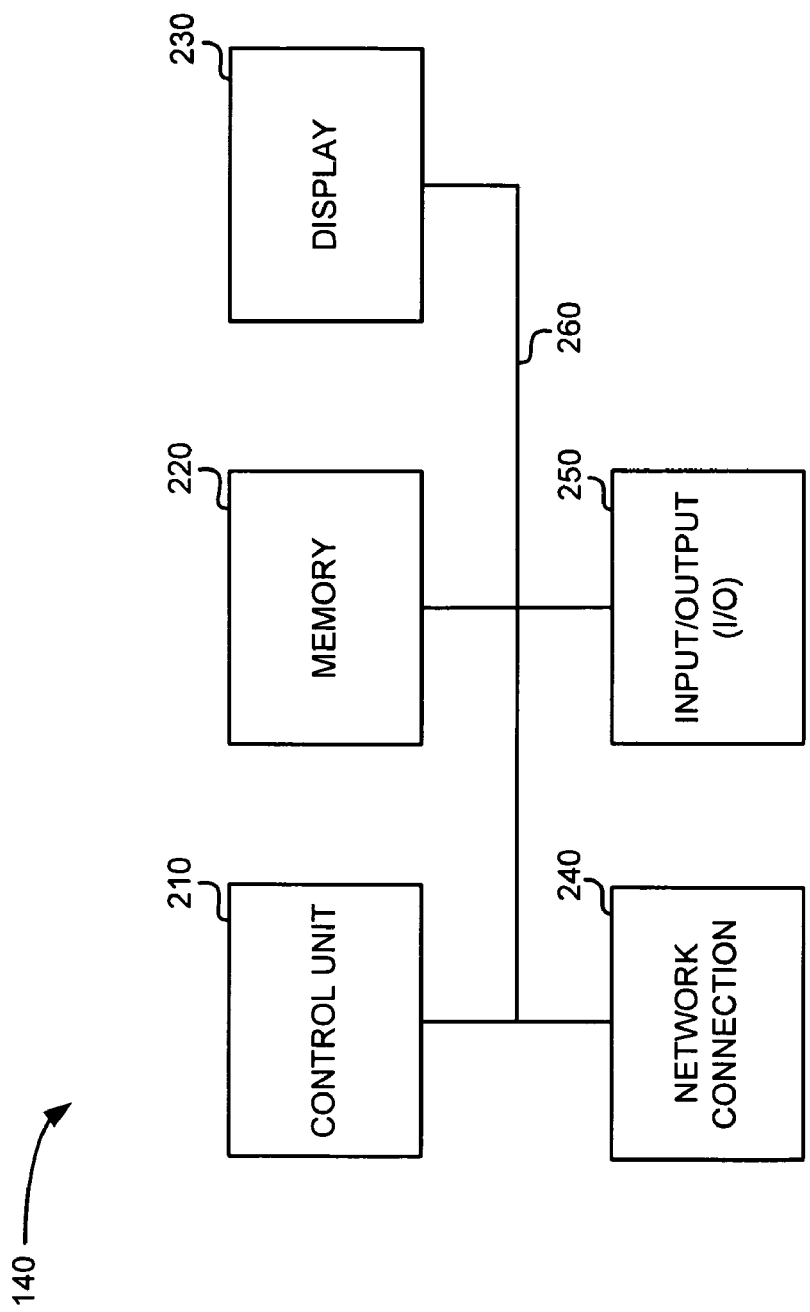
FIG. 2 is a block diagram of exemplary components of a set-top box that may be used in the network of FIG. 1.

FIG. 2 is diagram illustrating exemplary components of STB 140. As shown, STB 140 may include a control unit 210, memory 220, a display 230, a network connection 240, an input/output (I/O) component 250, and a bus 260.

Control unit 210 may include a processor, microprocessor, or other type of processing logic that may interpret and execute instructions. Among other functions, control unit 210 may collect and store viewing histories associated with television programming. Control unit 210 may execute instructions to send viewer start-up preferences and viewing history information to another device, such as server 120. Control unit 210 may also receive information and/or instructions from other devices, such as server 120.

Memory 220 may include a dynamic or static storage device that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, memory 220 may store user start-up preferences for a top program category to be used during a start-up sequence. Categories may be selected, for example, based on available categories determined by the subscription television provider.

Display 230 may include any component capable of providing visual information. For example, in one implementation, display 230 may be a light emitting diode (LED) or a liquid crystal display (LCD). In another implementation, display 230 may use another display technology, such as a dot matrix display, etc. Display 230 may display, for example, text (such as a time, a date or a channel selection), image, and/or video information. Display 230 may be an optional component.

Network connection 240 may include any transceiver-like mechanism that enables STB 140 to communicate with other devices and/or systems. For example, network connection 240 may include an Ethernet interface, an optical interface, a coaxial interface, a radio interface, or the like. Network connection 240 may allow for wired, wireless, and/or optical communication. Network connection 240 may be configured to connect STB 140 to a packet-based IP network.

Input/output devices 250 may generally include user input devices such as external buttons and output devices such as a display or printer. With input/output devices 250, a user may generally interact with STB 140. In some implementations, input/output devices 250 may be implemented via a remote control. Bus 260 may provide an interface through which components of STB 140 can communicate with one another.

As will be described in detail below, STB 140 may perform certain operations relating to communicating viewer preferences and/or automatically tuning to most-watched television programming (e.g., a top program) in accordance with the viewer preferences. STB 140 may perform these operations in response to control unit 210 executing software instructions contained in a computer-readable medium, such as memory 220. A computer-readable medium may be defined as a physical or logical memory device.

The software instructions may be read into memory 220 from another computer-readable medium or from another device. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of STB 140, in other implementations, STB 140 may include fewer, additional, and/or different components than those depicted in FIG. 2. In still other implementations, one or more components of STB 140 may perform one or more other tasks described as being performed by one or more other components of STB 140.

Figure 3:
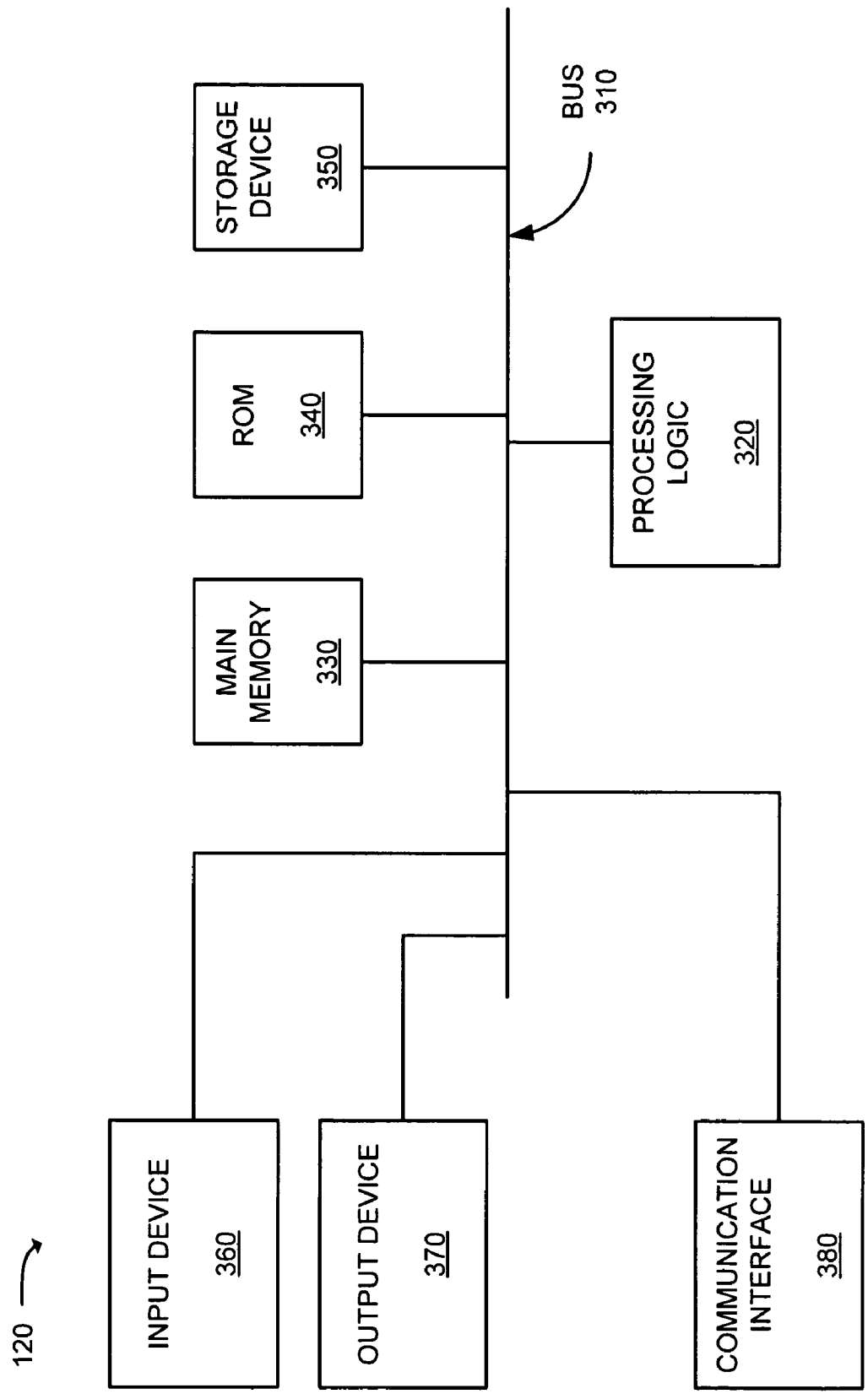
FIG. 3 is a block diagram of exemplary components of server that may be used in the network of FIG. 1.

FIG. 3 is a diagram of exemplary components of server 120. As illustrated, server 120 may include a bus 310, processing logic 320, a main memory 330, a read-only memory (ROM) 340, a storage device 350, an input device 360, an output device 370, and a communication interface 380. In other implementations, server 120 may include additional (or other) components than illustrated in FIG. 3.

Bus 310 may include a path that permits communication among the components of server 120. Processing logic 320 may include a processor, microprocessor, or other type of processing logic, such as an ASIC, FPGA, etc., that may interpret and execute instructions. Main memory 330 may include a RAM or another type of dynamic storage device that may store information and instructions for execution by processing logic 320. ROM 340 may include a ROM device or another type of static storage device that may store static information and instructions for use by processing logic 320. Storage device 350 may include a magnetic and/or optical recording medium and its corresponding drive. In one implementation, storage device may include database 160 (FIG. 1). Storage device 350 may store program ranking information that may indicate most-watched programs for particular time slots. In one implementation, storage device 350 may also store top programs for particular categories that are determined by the subscription television provider. Types of categories may include, for example, content type (e.g., news, sports, movies, sitcoms, etc.), location (e.g., national, regional, city, household, etc.), viewing duration (e.g., most frequently view channel), etc.

Input device 360 may include a mechanism that permits an operator to input information to server 120, such as a keyboard, a mouse, a pen, voice recognition and/or biometric mechanisms, a touch-screen interface, etc. Output device 370 may include a mechanism that outputs information to the operator, including a display, a printer, a speaker, etc. Communication interface 380 may include any transceiver-like mechanism that enables server 120 to communicate with other devices and/or systems, such as set-top box 210.

As will be described in detail below, server 120 may perform certain operations to identify most-watched programming either generally or within particularly specified criteria. Server 120 may perform these and other operations in response to processing logic 320 executing software instructions contained in a computer-readable medium, such as main memory 330.

The software instructions may be read into main memory 330 from another computer-readable medium, such as storage device 350, or from another device via communication interface 380. The software instructions contained in main memory 330 may cause processing logic 320 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Figure 4:
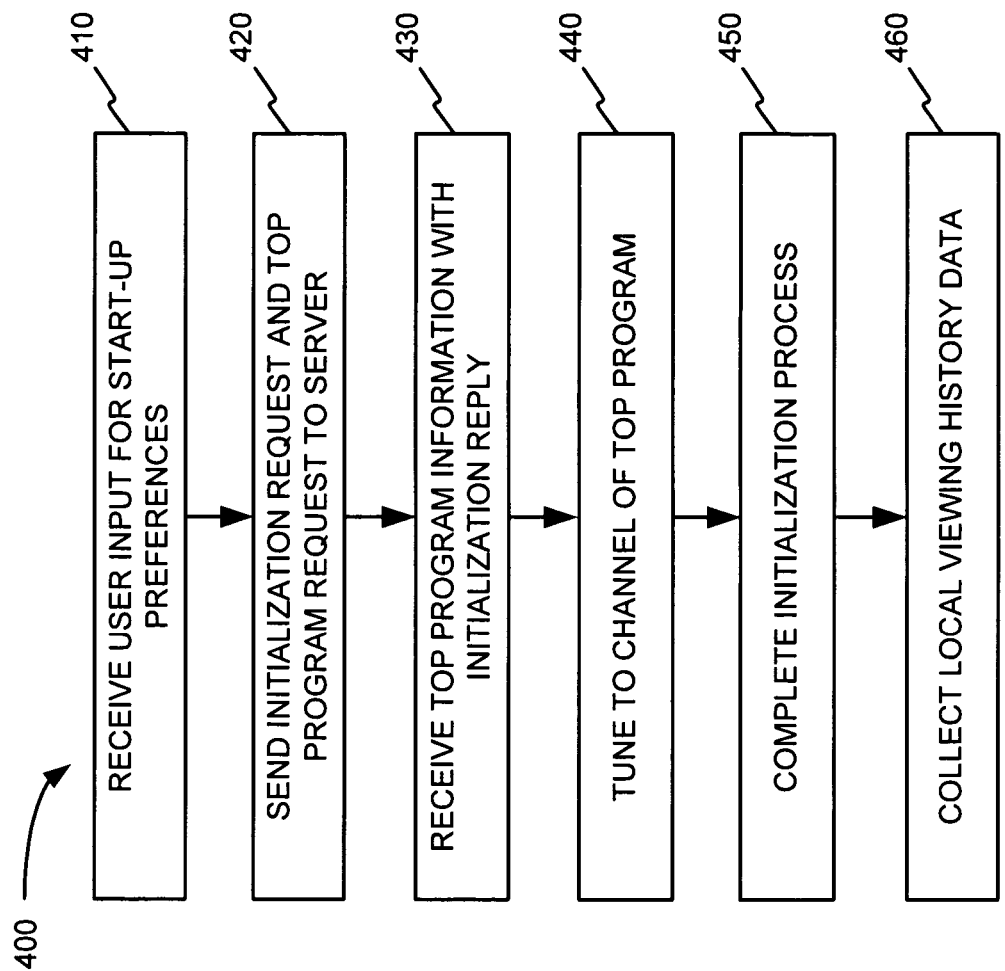
FIG. 4 is a process flow illustrating exemplary operations that may be performed by the set-top box to tune to a ranked program during an initialization sequence.

FIG. 4 provides a process flow 400 illustrating exemplary operations that may be performed by a set-top box, such as STB 140, to tune to a top program during an initialization sequence. Process 400 may begin with reception of user input for start-up preferences (block 410). For example, STB 140 may receive a viewer's input via a menu driven selection process. The viewer may provide inputs to STB 140 during a viewing session that occurs prior to an upcoming initialization sequence. Viewer options may include, for example, the most-watched program during the timeslot when the initialization process occurs or particular location-based programming (e.g., a local news and weather display).

An initialization request and top program request may be sent to a server (block 420). For example, when a user turns on television 150, STB 140 may send an initialization request message to server 120. The initialization request may be, for example, the beginning of a handshake sequence with server 120 that triggers a data download for set-top box applications, such as an electronic program guide. The initialization request message may include a top program request that indicates the viewer's previously-recorded input preference for a start-up program (e.g., the most-watched program during the timeslot when the initialization process occurs). While the top program request is described in block 420 as being included as part of the initialization request, in another implementation, the top program request may be sent to server 120 as a separate request.

An initialization reply with top program information may be received (block 430). For example, STB 140 may receive from server 120 an initialization reply that includes channel information for a program corresponding to the top program request. Thus, if the top program request is for a most-watched news program, STB 140 may receive, from server 120, a channel number for a station in the subscriber's region that is carrying the most-watched news program at that time. While the top program channel information is described in block 430 as being included as part of the initialization reply, in another implementation, the top program channel information may be sent to STB 140 as a separate message from the initialization reply.

A channel of the top program may be tuned (block 440). For example, STB 140 may tune to a channel that server 120 indicated is carrying the most-watched sports program. The initialization process may be completed (block 450). For example, STB 140 may continue to receive initialization information from server 120 until the initialization process is complete.

Optionally, viewing history data may be collected (block 460). For example, STB 140 may track information relating to programs provided to television 150. The tracked information may be stored and/or sent to server 120 for use in continuing to identify the most-watched programs.

Figure 5:
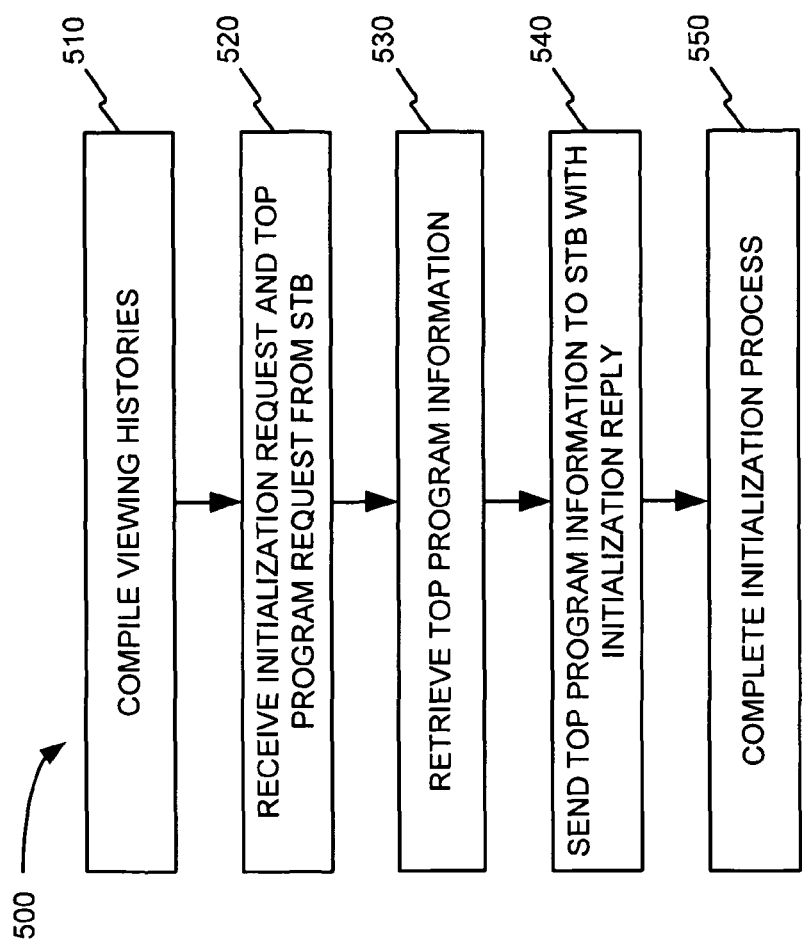
FIG. 5 is a process flow illustrating exemplary operations that may be performed by the server to provide a ranked program channel during an initialization sequence.

FIG. 5 is a process flow 500 illustrating exemplary operations that may be performed by a server (e.g., server 120) that provides top program information during an initialization sequence. Process 500 may begin with compilation of viewing histories (block 510). For example, server 120 may collect viewing history information received from STB 140 and other STBs. The view histories may be compiled and sorted to determine top program information, such as the most watched programs for particular time slots or the most-watched programs for particular categories for particular time slots.

An initialization request with a top program request may be received from a STB (block 520). For example, server 120 may receive an initialization request, from STB 140, that contains a top program request. The top program request may include a request for a most-watched program generally or a most-watched program within a particular category. In one implementation, the request may be included as part of the initialization handshake sequence between STB 140 and server 120.

Top program information may be retrieved (block 530). For example, server 120 may retrieve top program information consistent with the request received from STB 140. In one implementation, viewer history information may be retrieved from a data storage location, such as database 160. Top program information may include both an identification of the program content and identification of the particular channel number for the station that is broadcasting the program content.

An initialization reply with the top program information may be sent to the STB (block 540). For example, in one implementation, server 120 may send to STB 140 an initialization reply that includes the channel number of the top program consistent with the request received from STB 140. In another implementation, server 120 may send station information for the top program that STB 140 can match to a particular channel number.

The initialization process may be completed (block 550). For example, server 120 may continue to send information to STB 140 to complete the initialization process while television 150 remains tuned to the top program channel provided by server 120. A "please wait" indication may be shown in response to any user commands (e.g., via a remote control) for an electronic program guide or other data that is part of the initialization process until the initialization process is complete.

Figure 6A:
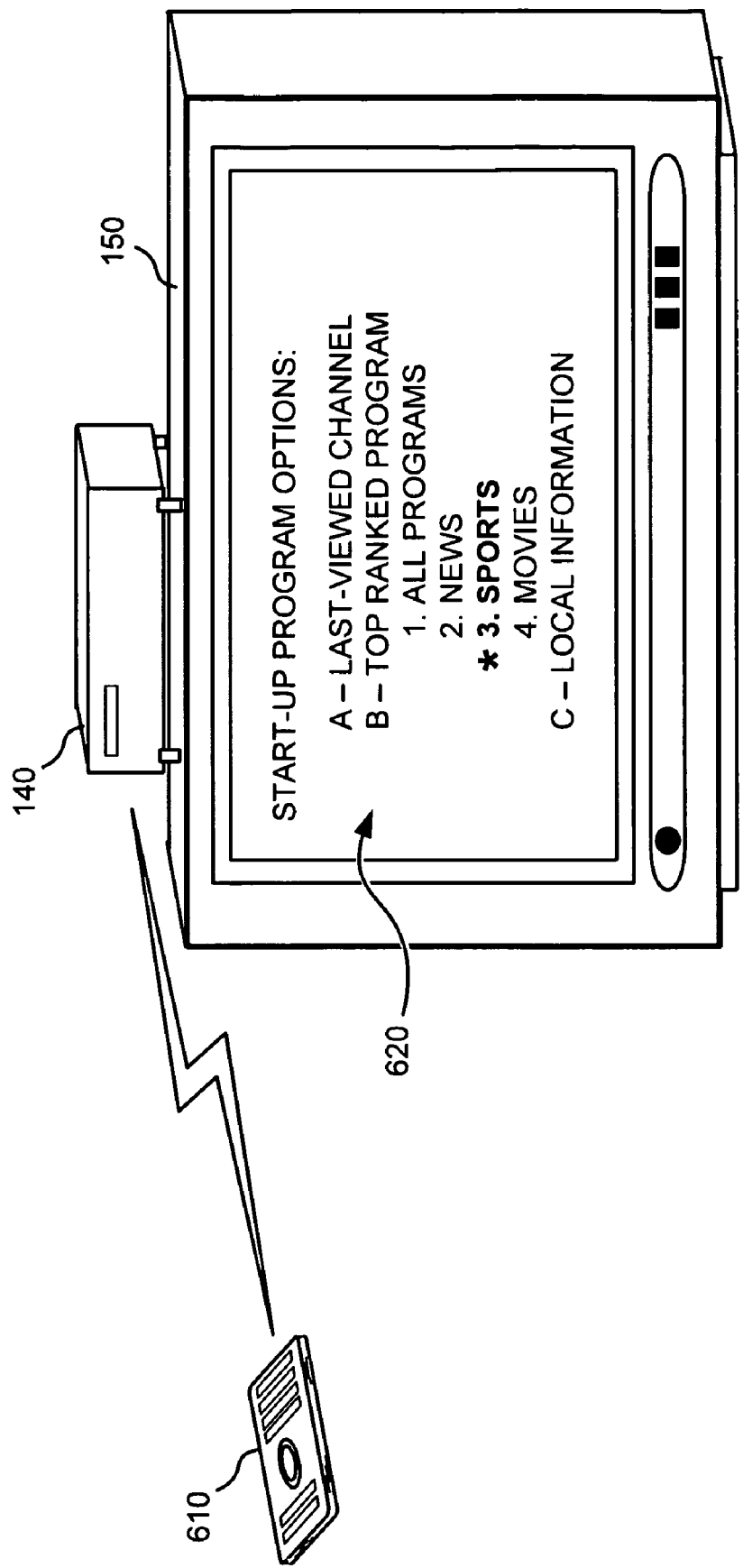
FIGS. 6A and 6B are exemplary diagrams illustrating a concept described herein.
Figure 6B:
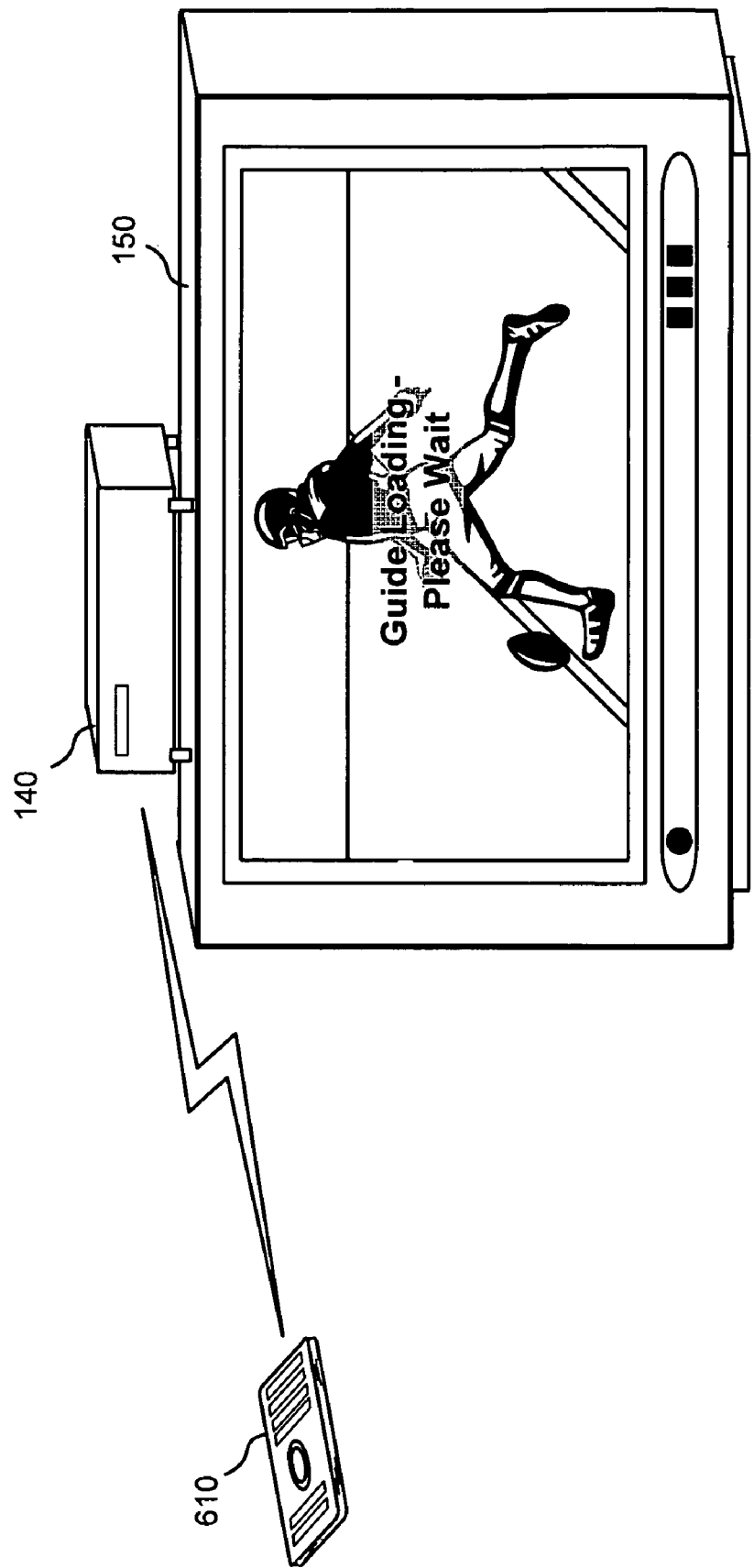

FIGS. 6A and 6B are exemplary diagrams illustrating an implementation of start-up tuning according to systems and/or methods described herein. More specifically, FIG. 6A provides an exemplary diagram of a user interface for selecting start-up program options. FIG. 6B provides an exemplary diagram of a start-up screen in accordance with the selection shown in FIG. 6A.

Referring to FIG. 6A, a viewer may elect to enter a preference for a type of programming to tune in upon starting television 150. The viewer may select (e.g., via a remote control 610) a category of start-up programming from a menu 620, such as the menu displayed on television 150 of FIG. 6A. For example, the viewer may select options such as "Last Viewed Channel" (e.g., the tuner will tune to the same channel that was being viewed at the end of the previous viewing session), "Top Ranked Program" (e.g., the tuner will tune to a program based on the viewing history of a particular group of viewers), "Local Information" (e.g., the tuner will tune to a local news/weather/information channel), etc.. Menu 620 may also include sub-menus for one or more options. Sub-menus may be implemented, for example, as drop-down menus within menu 620 or as separately displayed sub-menus (not shown). For example, as shown in FIG. 6A, the "Top Ranked Program" menu selection may include a sub-menu that allows a viewer to select from particular programming rankings. As further shown in FIG. 6A, programming may be ranked across all categories for a particular time slot (e.g., "All Programs") or programming may be ranked according to particular categories (e.g., "News," "Sports," or "Movies"). The options shown in menu 620 are exemplary, and many other categories and sub-categories of ranked programming may be used. Ranking of programs may be based on statistics provided from the service-provider (e.g., provided via server 120). Ranking may be based on, for example, national statistics, regional statistics, household statistics, etc. In one implementation, a viewer may be provided with the opportunity (e.g. via menu 620 or a separate sub-menu) to identify the base group (e.g., national, regional, or household) for determining the most-watch programming.

In the example of FIG. 6A, a viewer may select option "3. Sports," indicating that most-watched sports program for the time slot may be automatically tuned to upon the next initialization sequence. Referring to FIG. 6B, an exemplary diagram of a start-up screen is displayed on television 150. Based on the previously selected viewer preference from menu 620 (FIG. 6A), STB 140 may request from a server (e.g., server 120) the channel number of the most-watch sports program at the time the viewer turns on television 150. In the example of FIG. 6B, a college football program may be the most-watched program. Thus, upon receiving a response from the server, STB 140 may automatically tune television 150 to the channel that is showing the college football program. STB 140 may continue the initialization process while the college football program is displayed. If the viewer attempts to access the electronic program guide (e.g., by pressing a button on remote control 610) before the initialization process is complete, a message (e.g., "Guide Loading—Please Wait") may be displayed on the screen over the college football programming.

Systems and/or methods described herein may provide most-watched program information for viewers of a subscription television service. As a set-top box begins an initialization sequence (such as a start-up sequence for electronic program guide), the set-top box may receive from a server a channel number for the most-watched program, and may automatically tune to the most-watched program based on the channel number. The most-watched program may be tuned at the start of the set-top box initialization sequence to give the perception of a fast start time and to increase the probability of immediately providing programming content of interest to the viewer. Viewer preferences may be input and stored in the set-top box to specify particular most-watch program criteria, such as most-watched programs within a particular content category or within a particular geographic region.

The foregoing description provides illustration and description, but is not intended to be exhaustive or to limit the implementations to the precise form disclosed. Modifications and variations are possible in light of the above teachings or may be acquired from practice of systems and/or methods disclosed herein.

Also, while series of blocks have been described with regard to the flowchart of FIGS. 4 and 5, the order of the blocks may differ in other implementations. Further, non-dependent acts may be performed in parallel.

It will be apparent that implementations, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware—such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method, comprising:
   sending, by a device and to a server, a program request for a subscription television service, the program request being associated with a user;
   receiving, by the device and from the server and based on the program request, program information associated with a program and initialization information associated with a program guide before providing, for display, the program,
      the program information including a channel number for the program in a programming category at a time associated with the program request, and
      the program being associated with the program request and determined based on criteria associated with the user and viewing information associated with the user;
   automatically tuning, by the device, to the program based on the program information received from the server;
   providing for display, by the device and after receiving the initialization information, the program;
   processing, by the device, the initialization information, the program being displayed before completion of the processing;
   generating, by the device, a status indicator that indicates a status of the processing; and
   providing for display, by the device, the status indicator with the program on one screenshot.

2. The method of claim 1, where the program request is included in a program guide initialization request.

3. The method of claim 1, where the program comprises a most-watched program during the time of the request.

4. The method of claim 1, where the program request indicates a most-watched program within a particular programming content category.

5. The method of claim 1, further comprising:
   receiving user input to identify preferences for the program request.

6. The method of claim 1, further comprising:
   collecting local viewing history data to provide to the server for determining the program.

7. The method of claim 1, where sending, to the server, the program request for the subscription television service is conducted automatically upon a user powering up a set-top box for the subscription television service.

8. A device comprising:
   a receiver to receive programming content and viewing data from a server, and
   a processor to:
      send, to the server, a request to identify a program at a time of the request, the request being associated with a user,
      receive, from the server and based on the request, program information associated with a program and initialization information associated with a program guide before providing, for display, the identified program,
         the program information including a channel number for the program in a programming category at a time associated with the request, and
         the program being associated with the request and determined based on criteria associated with the user and viewing information associated with the user,
      automatically tune to the program based on the program information,
      provide, for display and after receiving the initialization information, the program,
      process the initialization information, the program being displayed before completion of the processing,
      generate a status indicator that indicates a status of the processing, and
      provide, for display, the status indicator with the program on one screenshot.

9. The device of claim 8, where the request to identify the program at the time of the request is included in an initialization request.

10. The device of claim 8, where the processor is further to:
    receive initialization information from the server while remaining tuned to the program.

11. The device of claim 8, where the processor is further to:
    collect local viewing history data; and
    transmit the collected local viewing history data to the server.

12. A computer-readable memory device storing instructions, the instructions comprising:
    one or more instructions which, when executed by a processor, cause the processor to request program information associated with a program and initialization information associated with a program guide from a subscription television service;
       the program being associated with the request and determined based on criteria associated with a user and viewing information associated with the user;

one or more instructions which, when executed by the processor, cause the processor to receive a channel identification for the program for a time slot;

one or more instructions which, when executed by the processor, cause the processor to receive, based on the request, the program information associated with the program and the initialization information associated with a program guide before providing, for display, the program;

one or more instructions which, when executed by the processor, cause the processor to automatically tune to the program based on the channel identification, one or more instructions which, when executed by the processor, cause the processor to provide, for display and after receiving the initialization information, the program;

one or more instructions which, when executed by the processor, cause the processor to process the initialization information, the program being displayed before completion of the processing;

one or more instructions which, when executed by the processor, cause the processor to generate a status indicator that indicates a status of the processing, and one or more instructions which, when executed by the processor, cause the processor to provide, for display, the status indicator with the program on one screenshot.

13. The computer-readable memory device of claim 12, the instructions further comprising:
one or more instructions to load data for an electronic program guide while the program is displayed.

14. The computer-readable memory device of claim 12, the instructions further comprising:
one or more instructions to collect viewing history data, the program information being based on the collected viewing history.

15. The computer-readable memory device of claim 12, the instructions further comprising:
one or more instructions to receive information associated with a user input, the program information being based on the received information.

16. The computer-readable memory device of claim 12, where the program comprises a most-watched program during the time slot.

17. The computer-readable memory device of claim 12, where the program comprises a most-watched program within a particular programming content category.

18. The device of claim 8, where the processor is further to:
automatically send the request when the device is turned on.

19. The device of claim 8, where the program comprises a most-watched program during the time of the request.

20. The device of claim 8, where the program comprises a most-watched program within a particular programming content category.

* * * * *